(12) United States Patent
Poivre et al.

(10) Patent No.: US 6,182,207 B1
(45) Date of Patent: Jan. 30, 2001

(54) MICROCONTROLLER WITH REGISTER SYSTEM FOR THE INDIRECT ACCESSING OF INTERNAL MEMORY VIA AUXILIARY REGISTER

(75) Inventors: Gregory Poivre; Jean-Hugues Bosset, both of Grenoble (FR)

(73) Assignee: STMicroelectronics S.A., Gentilly (FR)

( * ) Notice: Under 35 U.S.C. 154(b), the term of this patent shall be extended for 0 days.

(21) Appl. No.: 09/213,522

(22) Filed: Dec. 17, 1998

(30) Foreign Application Priority Data

Dec. 19, 1997 (FR) .................................................. 97 16198

(51) Int. Cl.[7] .............................. G06F 9/312; G06F 12/00
(52) U.S. Cl. ............................... 712/225; 712/36; 712/38; 711/103; 711/219
(58) Field of Search ............................... 711/100, 2, 103, 711/217, 218, 219; 712/36, 38, 39, 40, 225

(56) References Cited

U.S. PATENT DOCUMENTS

| | | |
|---|---|---|
| 3,972,025 * | 7/1976 | Taddei ........................................ 711/2 |
| 3,975,714 * | 8/1976 | Weber et al. ............................. 712/32 |
| 4,153,933 * | 5/1979 | Blume, Jr. et al. ..................... 711/219 |
| 5,426,769 | 6/1995 | Pawloski . |
| 5,428,760 * | 6/1995 | Glori et al. ............................ 711/149 |
| 5,524,267 | 6/1996 | Chin et al. . |

* cited by examiner

Primary Examiner—Richard L. Ellis
(74) Attorney, Agent, or Firm—Theodore E. Galanthay; Allen, Dyer, Doppelt, Milbrath & Gilchrist, P.A

(57) ABSTRACT

To accelerate read operations, or the operations that modify the operating parameters of a microcontroller, an interface is provided with three registers—an address register, an instruction and data register, and an auxiliary register. The instruction and data register supports the auxiliary register by indirect addressing. The address register is furthermore provided with an incrementation circuit mechanism for indirect incrementation. With the indirect addressing and the automatic incrementation, the number of external operations are reduced for continuous read or write operations.

15 Claims, 2 Drawing Sheets

MICROCONTROLLER WITH REGISTER SYSTEM FOR THE INDIRECT ACCESSING OF INTERNAL MEMORY VIA AUXILIARY REGISTER

FIELD OF THE INVENTION

The invention relates to microcontrollers, and, more particularly, to a microcontroller interface.

DESCRIPTION OF THE PRIOR ART

A microcontroller is a circuit that includes a microprocessor or a central processing unit, and a program memory on the same integrated circuit. A set of instructions for the microprocessor is stored in the program memory, and is adapted to a program or application executable by the microcontroller. There are known microcontrollers with sets of instructions that are powerful in varying degrees. These programs vary in size depending on the application for which they are intended. Example applications include control of a hard disk in a compatible type microcomputer, or control of an element, such as flasher lights in an automobile.

Conceiving and finalizing a set of instructions for the microcontroller program is often a slow and tedious process. The microcontroller has an interface to exchange information external to the microcontroller. This information includes data to be received and data to be sent, which corresponds to the intended use of the microcontroller. To support this exchange of information, the interface has a control bus and, more generally, two data exchange registers or address exchange registers.

The interface is generally a wired circuit that provides for a series-parallel conversion between a protocol (parallel) internal to the microcontroller, and a protocol (series) generally used to interface the microcontroller. More generally, the interface has protocol conversion circuits. In certain cases, the control bus itself is non-existent. The control bus is replaced by a particular configuration of bits of words loaded into the exchange registers.

For cost reasons, it is acceptable to reduce the exchange structure external to the microcontroller to a strict minimum. In particular, this is why the number of registers are small. As a result, the use of the microcontroller becomes cumbersome, especially during a phase of setting the control program. During the setting phase, the microcontroller is connected to a host circuit. The purpose of this connection is to monitor the operation of the microcontroller. In this case, it is necessary to read electrical states of the microcontroller at certain stages, e.g., those stages where a faulty operation has been detected.

Another purpose of the connection is to set the operation of the microcontroller. In this case, the host circuit writes states in certain registers of the microcontroller. For each read action performed on the microcontroller, the host circuit has to initiate three operations. The first operation includes loading into the exchange registers a read command and the address where data must be read in the microcontroller. The second operation relates to the execution of the command that has been loaded. The third operation relates to reading in an exchange register of the data element read at the indicated address.

This mechanism is lengthy. A problem of the duration of the finalizing process arises, especially when the number of locations of the microcontroller memory to be read is large. At the time of the write operation for the setting of the microcontroller, the operation is slightly shorter. A first step includes loading of the write command and the data to be read, as well as the address at which the data must be written in the memory (or in a register) of the microcontroller. In a second step, the host circuit commands the microcontroller to carry out the write instruction available in the exchange registers. In the above described case, two steps are needed to modify a data element which is too lengthy.

Memory locations in the memory of the microcontroller where writing or reading is to be performed are varied. Hereinafter, this description limits itself to the term "memory." The term "memory of the microcontroller" relates to the memory and the working registers of the microcontroller. This memory may thus be a program memory, i.e., where the instructions to be performed are stored in the microprocessor. This memory may also be a data memory, i.e., where the measured data or control parameters of the microcontroller are stored.

Finally, this memory could represent a batch of parameter-setting registers or operation registers of the microcontroller. In particular, the memory represents a batch of registers for setting the parameters of its peripherals. Because the interface itself is likely to accept different protocols, the interface must have its parameters set by states stored in the registers. Other peripherals such as internal counters, clock frequency registers, or even registers for monitoring the microcontroller are thus effected by the exchanges with the interface.

In particular, with regard to monitoring of the operation of the microcontroller, certain applications set up supplementary registers that can be used, in emulation, to monitor the operation of the microcontroller. This monitoring is necessary during the finalizing steps. Thus, the slowness of the communications carried out at the interface is further emphasized by the structurally complicated relationship with the supplementary registers in an indirect addressing mode.

SUMMARY OF THE INVENTION

An object of the present invention is to provide a microcontroller with an improved interface, as well as a method for using the microcontroller with its improved interface. The present invention seeks to accelerate the interface between a microcontroller and devices external to the microcontroller. This acceleration primarily relates to the final adjusting of the operation of the microcontroller. However, it could relate to any conventional phase of use of the microcontroller.

It is an object of the invention to resolve the slowness of the exchanges by accelerating operations of the interface. Rather than follow a three-step operation or a two-step operation for the write operation, the invention modifies the architecture of the microcontroller so that it can be performed in only one step. In the invention, the interface is provided with an auxiliary supplementary register. Furthermore, there is a provision for automatically incrementing the address contained in one of the two exchange registers initially provided. For the finalizing process, it is primarily the monitoring of the registers or of the contiguous address memory locations that is performed. Consequently, an incrementation circuit added to the structure of the invention automatically provides an address increment. In practice, the address increment is equal to 1, but could nevertheless be arranged differently.

In one approach, the incrementation circuit is correlated to the reading or writing of the auxiliary register. Thus, it is sufficient to read or write the auxiliary register so that a command loaded into the control register is automatically executed. It can also be shown that management of the interfaces is carried out three times faster.

Another object of the invention therefore is to provide a microcontroller that includes a central processing unit, a program and/or data memory connected with the central processing unit, an input/output interface, a first exchange register containing an instruction code and an information element pertaining to a data element to be read or written, and a second exchange register containing an address. The first and second registers are connected to the interface. A switching circuit is connected to the interface, the program memory, and the central processing unit to carry out the switch-over as a function of a control signal. The control signal is available at this interface to provide a connection between the central processing unit and the program memory to provide a connection between the two exchange registers and the central processing unit.

The microcontroller also includes an auxiliary register connected to the interface, an automatic address implementation circuit to increment the value of an address contained in the second exchange register, and means for indirect addressing directed towards the auxiliary register. Using information on the data element, the means for indirect addressing takes the address of the auxiliary register, where the data element is stored, from the first exchange register.

Another object of the invention is to provide a method for reading/writing in a data memory for a microcontroller from an input/output interface in which an instruction code, an information element pertaining to a data element to be read or written, and an address are loaded into first and second exchange registers of the microcontroller. The operation of a central processing unit of the microcontroller is switched over for executing the instruction code loaded into the first register. The data read or to be written is loaded into an auxiliary register connected to the interface. An incrementation circuit is used to automatically increment the address loaded into the second register. The instruction code loaded into the first register is executed with an indirect addressing operation directed towards the auxiliary register.

BRIEF DESCRIPTION OF THE DRAWINGS

The invention will be understood more clearly from the following description and from the appended figures. These figures are given purely by way of an indication and in no way restrict the scope of the invention. Of these figures.

DETAILED DESCRIPTION OF THE PREFERRED EMBODIMENTS

Figure 1:
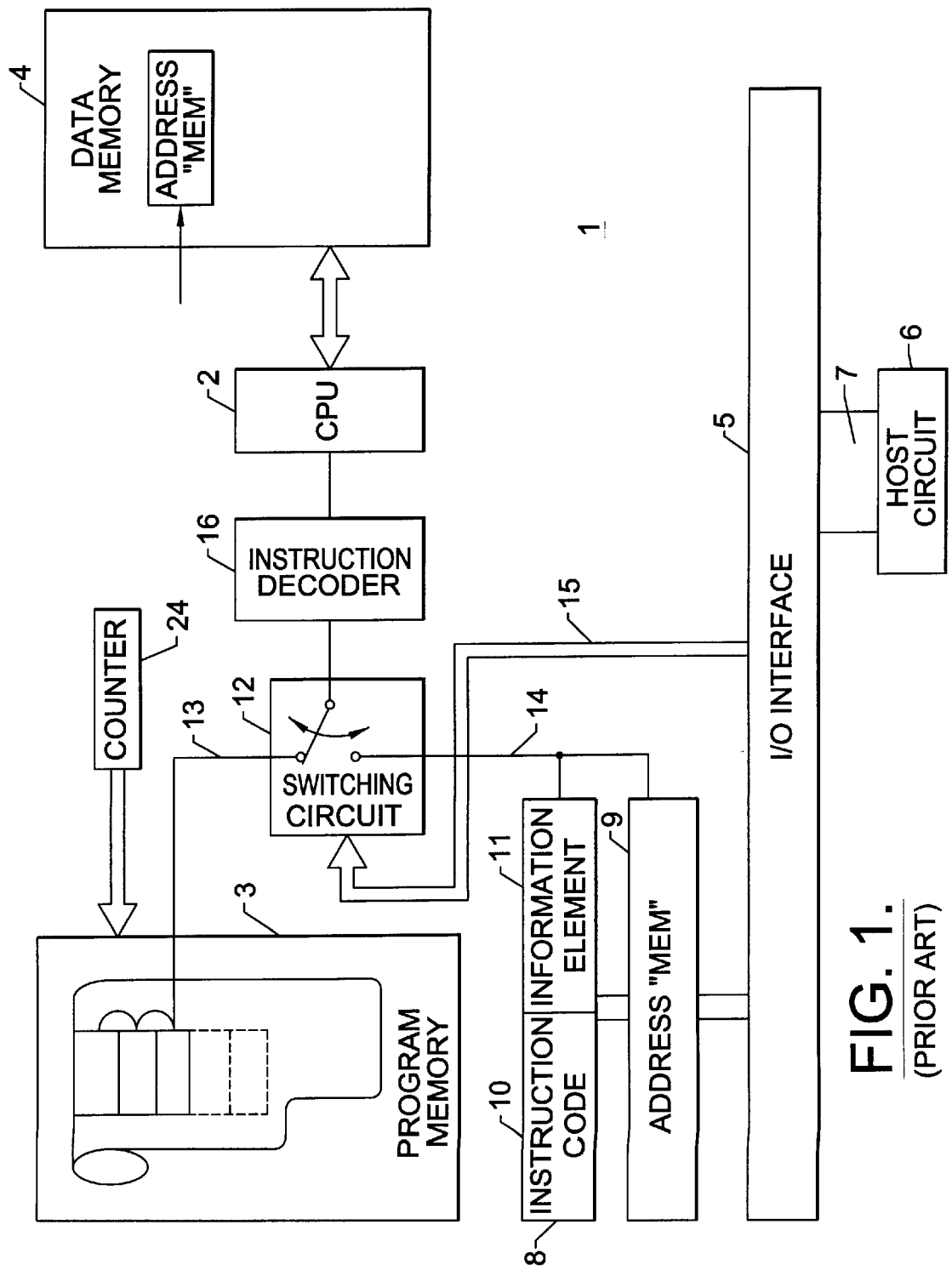
FIG. 1 provides a schematic view of a microcontroller according to the prior art.
Figure 2:
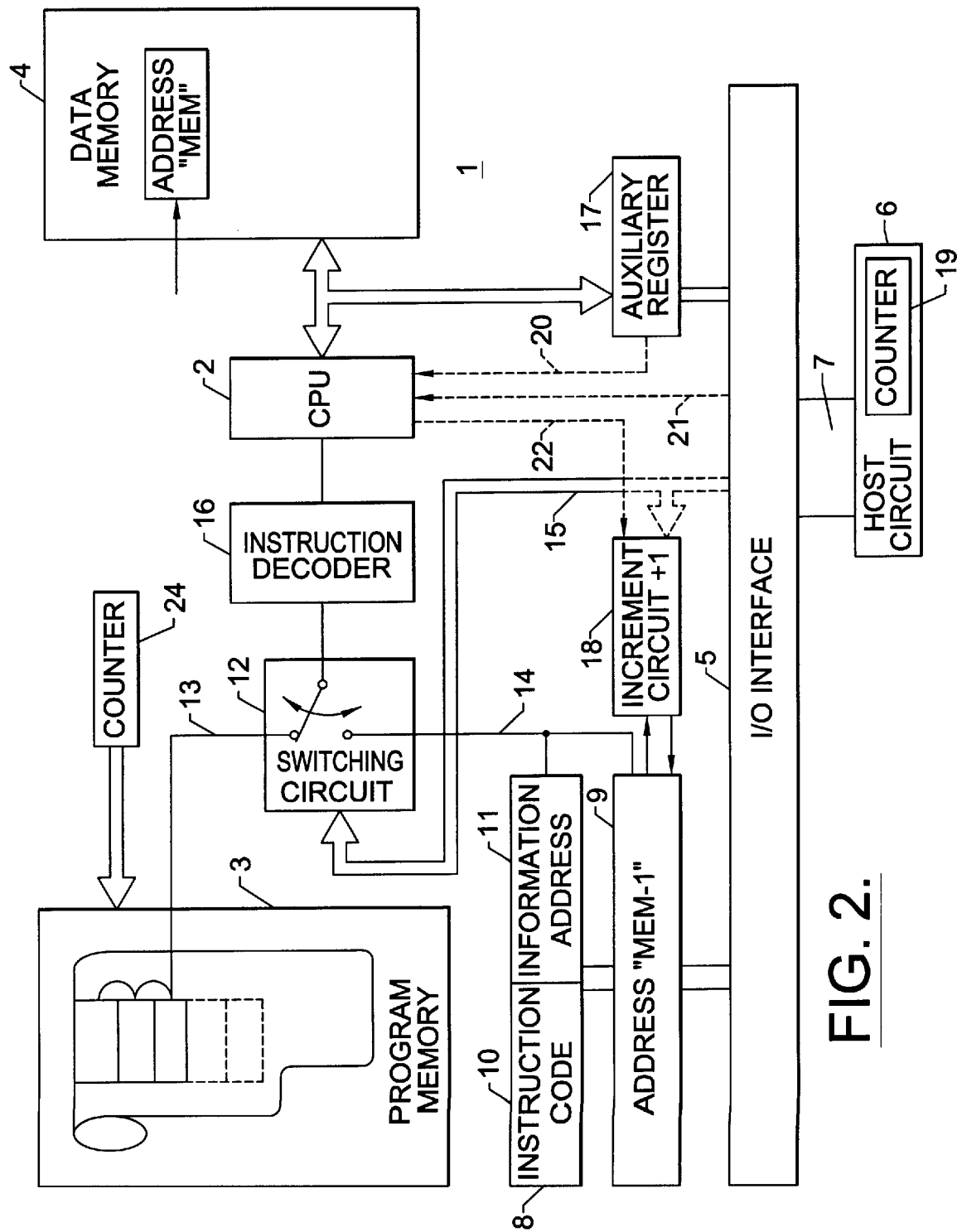
FIG. 2 provides a schematic view of a microcontroller according to the present invention.

FIGS. 1 and 2 show a microcontroller 1 having a central processing unit 2, a program memory 3 and a data memory 4. The program memory 3 and the data memory 4 may be merged into a single memory. In one embodiment, the program memory 3 is a non-volatile memory or a back-up memory, and the data memory 4 is a volatile memory. However, the program memory 3 can be a volatile memory, and its loading can be performed when the microcontroller 1 is put into operation. The memories 3 and 4, which are symbolically shown in FIGS. 1 and 2, may also comprise parameter-setting registers for operating the microcontroller or its peripherals. As indicated above, they may also represent registers for the monitoring operation of the microcontroller in an emulation mode.

The microcontroller 1 of FIGS. 1 and 2 also comprises an input/output (I/O) interface 5. The I/O interface 5 is used to provide for the interface between a host circuit 6 and a microcontroller 1. In one example, the host circuit 6 is a compatible type microcomputer connected to the interface by an RS232 type interface 7. In one embodiment, the I/O interface 5 is a parallel/series interface. On the microcontroller side, the interface is parallel. There are as many wires as are necessary in the communication buses with the circuits of the microcontroller 1. In the interface 7 with the host circuit 6, the number of wires is generally reduced. In addition, two-wire buses are well known in the art. The I/O interface 5 carries out the protocol conversion between internal and external communications of the microcontroller 1.

The microcontroller 1 furthermore has a first exchange register 8 and a second exchange register 9. The first register 8 is designed to contain an instruction code 10 and an information element 11 pertaining to a data element to be read or written. In the prior art (FIG. 1), the data element loaded into the information element 11 of the first register 8 is the data element itself. The data element is one that has been read or has to be written in one of the memories 3 or 4.

In the present invention (FIG. 2), the information pertaining to the data element to be read or written is actually an address information. The address is the address of an auxiliary register where the data element read has been written, or it is the address which has been written before the intended writing operation is performed. The second register 9 has an information element pertaining to the address of the location where it is necessary to read or write the data element referenced in the information element 11 of the first register 8.

The circuits of FIGS. 1 and 2 have a switching circuit 12 for the switching over, as a function of a control signal, an interface 13 between the central processing unit 2 and the program memory 3 to an interface 14 between the central processing unit 2 and the set of registers 8 and 9. The control signal of the switching circuit 12 is provided by a bus 15 connected to the I/O interface 5.

In the prior art, a read operation is performed as follows. Initially, by means of the I/O interface 5, the host circuit 6 loads an instruction code in the first register 8 and an address in the second register 9 into the set of registers 8 and 9. In the meantime, the central processing unit 2 is still in a normal interface 13 between the program memory 3 and the data memory 4. During a second step, the host circuit 6 sends a command through the I/O interface 5 to the bus 15 to activate the switch-over of the switching circuit 12. Thus, the loaded instruction code 10 is transmitted through an instruction decoder 16 to the central processing unit 2. This central processing unit 2 executes the instruction. For example, since the instruction is a read instruction, the central processing unit 2 prompts the reading in the data memory 4 of an information element stored at an address "mem" whose value is stored in the second register 9.

The instruction code 10 loaded into the first register 8 has the effect of executing the central processing unit 2 to transfer the value read in the data memory 4 into the instruction element 11 of the first register 8. Following the read operation, the data element read at the address "mem" is available in the information element 11 of the first register 8. During a third step, the host circuit 6 reads the contents of the first register 8, which is a fairly lengthy operation.

In the invention, as illustrated in FIG. 2, the architecture of the microcontroller 1 of FIG. 1 has been modified to include an auxiliary register 17. The auxiliary register 17 is connected to the I/O interface 5 and to the central processing unit 2. This configuration allows the auxiliary register 17 to be addressed by the central processing unit 2 and by the I/O interface 5.

The microcontroller 1 of the present invention furthermore has an incrementation circuit 18 to automatically increment the value of an address contained in the second register 9. As indicated above, the information stored in the information element 11 of the first register 8 no longer concerns the data element itself but contains, for a read or write mode, the address of the auxiliary register 17.

The use of the circuit of the invention is simpler than that of the prior art. In one embodiment, it is enough to drive the incrementation circuit 18 to prompt the incrementation of the location where the data elements are to be read or written. Operation of the incrementation circuit 18 may be obtained by a connection to the bus 15. Operation of the microcontroller 1 is then as follows. For the reading of a location of the memory, there is a succession of commands as described in the following paragraphs.

In a first step, the loading of the read instruction code 10 into the first register 8 is performed, and the loading of the address of the auxiliary register 17 into the information element 11 of the first register 8 is performed. During the same step, the address "mem−1", i.e., the location of the data memory 4 where the information has to be read, is loaded into the second register 9.

During a second step, the read command is sent over the bus 15. At the same time, the switch-over command is sent to the switching circuit 12, the incrementation circuit 18 modifies the value of the address stored in the second register 9, and this address becomes "mem." The central processing circuit 2 then performs the read instruction loaded into the instruction code 10 of the first register 8. However, the instruction code 10 of this read instruction is different from the instruction code of the read instruction in FIG. 1. The difference is that the result read in the data memory 4 should subsequently not be stored in the information element 11 of the first register 8, but in the auxiliary register 17. In a third step, the host circuit 6 reads the result in the auxiliary register 17 instead of reading it in the first register 8.

For this first read operation, there is no advantage with the circuit of the invention. On the contrary, for a following read operation, it is no longer necessary to load either the first register 8 or the second register 9. It is sufficient to send the switch-over command or the command for maintaining the relationship over interface 14 between the central processing unit 2 and the set of registers 8 and 9 on the bus 15. In other words, in only two steps instead of three steps, the data elements stored in the data memory 4 at the address "mem+1" are available in the auxiliary register 17. The duration of the read operation is reduced by 30% for the following locations of the data memory 4.

For the write operation, the duration would be the same since it is necessary to record the data to be written in the auxiliary register 17 and initiate the instruction by a command over the bus 15. In one embodiment, the command sent by the I/O interface 5 on the bus 15 is eliminated. More specifically, the step during which the switch-over command is sent on the bus 15 is eliminated. This independent step is replaced by an automatic performance of this step at the end of the reading or writing of the data in the auxiliary register 17.

Thus, for the read operation, the instruction code loaded into the instruction code 10 of the first register 8 is still different. The central processing unit 2 interprets the instruction code to read data elements in the data memory 4 and write them in the auxiliary register 17. The central processing unit 2 monitors the auxiliary register 17 or the I/O interface 5 to detect the point in time at which the host circuit 6 will have read the data available in the auxiliary circuit 17. As soon as this read operation is performed, the central processing unit 2 prompts an incrementation by the incrementation circuit 18 of the address in the second register 9, and the instruction code which has remained stored in the instruction code 10 is executed.

The monitoring of the reading of the auxiliary register 17 or of the I/O interface 5 is done by the central processing unit 2 through the reading of one of the registers designed for the management of the peripheral of the I/O interface 5 or auxiliary register 17. The monitoring by the central processing unit 2 of the reading of the auxiliary register 17 or of the I/O interface 5 at the time of the reading is shown by dashed sections 20 and 21. The control of the incrementation of the incrementation circuit 18 is represented by a dashed interface 22. The central processing unit 2 therefore can easily prompt the reiteration of the successive read operations and can easily make all the data elements that are read available in the auxiliary register 17. For the write operation, it is precisely the same steps that take place, except that the central processing unit 2 now monitors if the host circuit 6 has written a new data element in the auxiliary register 17.

To simplify the description, for 100 successive read operations, the circuit of the invention requires 102 interventions by the host circuit 6 over the I/O interface 5 instead of the 300 interventions of the prior art. With regards to the write operation, there will be 101 actions instead of the 200 actions in the prior art. The increases in speed of exchanges between the host circuit 6 and the central processing unit 2 are therefore highly significant.

To end the operation, the central processing unit 2 can be provided with a counter. This counter would be precharged as a function of the number of increments of positions in the data memory 4 that have to be considered. The counter would be similar to a counter 24 of stacks that takes instructions one after the other from the program memory 3. It is also possible to change the instruction code memorized in the instruction code 10 of the first register 8 in such a way that this instruction code no longer provides for the automatic incrementation of the incrementation circuit 18. This is done before reading or writing the last data element in the auxiliary register 17.

An incrementation circuit 18 external to the central processing unit 2 is shown in FIG. 2. However, the function of the incrementation circuit 18 is executed by the central processing unit 2. In this way, the incrementation circuit 18 will conventionally perform only one of the operations naturally performed by the central processing unit 2. The counting could also be limited by a counting performed by the central processing unit 2 on the number of iterations to be undertaken. The number of iterations may be loaded as one of the arguments of the instruction code or of the address "mem" when the operation is begun. Alternatively, the host circuit 6 could include a counter 19 for notifying when it is necessary to modify the instruction code loaded into the instruction code 10 of the first register 8 to make the iteration stop.

That which is claimed is:

1. A microcontroller comprising:

a central processing unit;

a memory connected to said central processing unit;

an input/output interface;

a first exchange register connected to said input/output interface, said first exchange register to contain an instruction code and an information element corresponding to a data element to be read or written;

a second exchange register connected to said input/output interface, said second exchange register to contain an address;

a switching circuit connected to said input/output interface, to said program memory, to said central processing unit, to said first and second exchange registers, said switching circuit responsive to a control signal provided by said input/output interface for carrying out a switchover of a connection between said central processing unit and said memory to a connection between said central processing unit and said first and second exchange registers;

an auxiliary register connected to said input/output interface;

an incrementation circuit for automatically incrementing a value of the address in said second exchange register; and means for indirect addressing directed towards said auxiliary register, wherein the information element contained in said first register corresponds to an address in said auxiliary register where the data element is to be stored.

2. A microcontroller according to claim 1, further comprising means to initiate execution of the instruction code for loading into said first register as soon as said input/output interface has read or written the data element in said auxiliary register.

3. A microcontroller according to claim 1, wherein said memory comprises a program memory.

4. A microcontroller according to claim 1, wherein said memory comprises a data memory.

5. A microcontroller according to claim 1, wherein said input/output interface comprises a parallel/serial interface.

6. A microcontroller according to claim 1, further comprising a counter connected to said memory for counting a number of iterations to be performed.

7. A microcontroller comprising:

a central processing unit;

a program memory connected to said central processing unit;

a data memory connected to said central processing unit;

an input/output interface;

a first exchange register connected to said input/output interface, said first exchange register to contain an instruction code and an information element corresponding to a data element to be read or written;

a second exchange register connected to said input/output interface, said second exchange register to contain an address corresponding to a location in said data memory where the data element is to be read or written;

a switching circuit connected to said input/output interface, to said program memory, to said central processing unit, and to said first and second exchange registers, said switching circuit responsive to a control signal provided by said input/output interface for carrying out a switchover of a connection between said central processing unit and said memory to a connection between said central processing unit and said first and second exchange registers;

an auxiliary register connected to said input/output interface and to said data memory;

an incrementation circuit for automatically incrementing a value of the address in said second exchange register; and means for indirect addressing directed towards said auxiliary register, wherein the information element contained in said first register corresponds to an address in said auxiliary register where the data element is to be stored.

8. A microcontroller according to claim 7, further comprising means to initiate execution of the instruction code for loading into said first register as soon as said input/output interface has read or written the data element in said auxiliary register.

9. A microcontroller according to claim 7, wherein said input/output interface comprises a parallel/serial interface.

10. A microcontroller according to claim 7, further comprising a counter connected to said memory for counting a number of iterations to be performed.

11. A method for reading/writing in a data memory of a microcontroller from an input/output interface, the method comprising the steps of:

loading an instruction code and an information element corresponding to a data element to be read or written into a first register of the microcontroller;

loading an address into a second exchange register of the microcontroller;

switching over operation of a central processing unit of the microcontroller so that the central processing unit executes the instruction code loaded into the first register;

loading the data read or to be written into an auxiliary register connected to the input/output interface;

automatically incrementing the address loaded into the second register; and executing the instruction code with an indirect addressing directed towards said auxiliary register, wherein the information element contained in said first register corresponds to an address in said auxiliary register where the data element is to be stored.

12. A method according to claim 11, wherein said input/output interface comprises a parallel/serial interface.

13. A method according to claim 11, wherein the step of switching comprises the step of switching over a connection between the central processing unit and a memory to a connection between the central processing unit and the first and second exchange registers.

14. A method according to claim 11, wherein the step of switching is activated based upon a control signal provided over the input/output interface.

15. A method according to claim 11, further comprising the step of counting a number of iterations to be performed.

* * * * *